Figure 1:
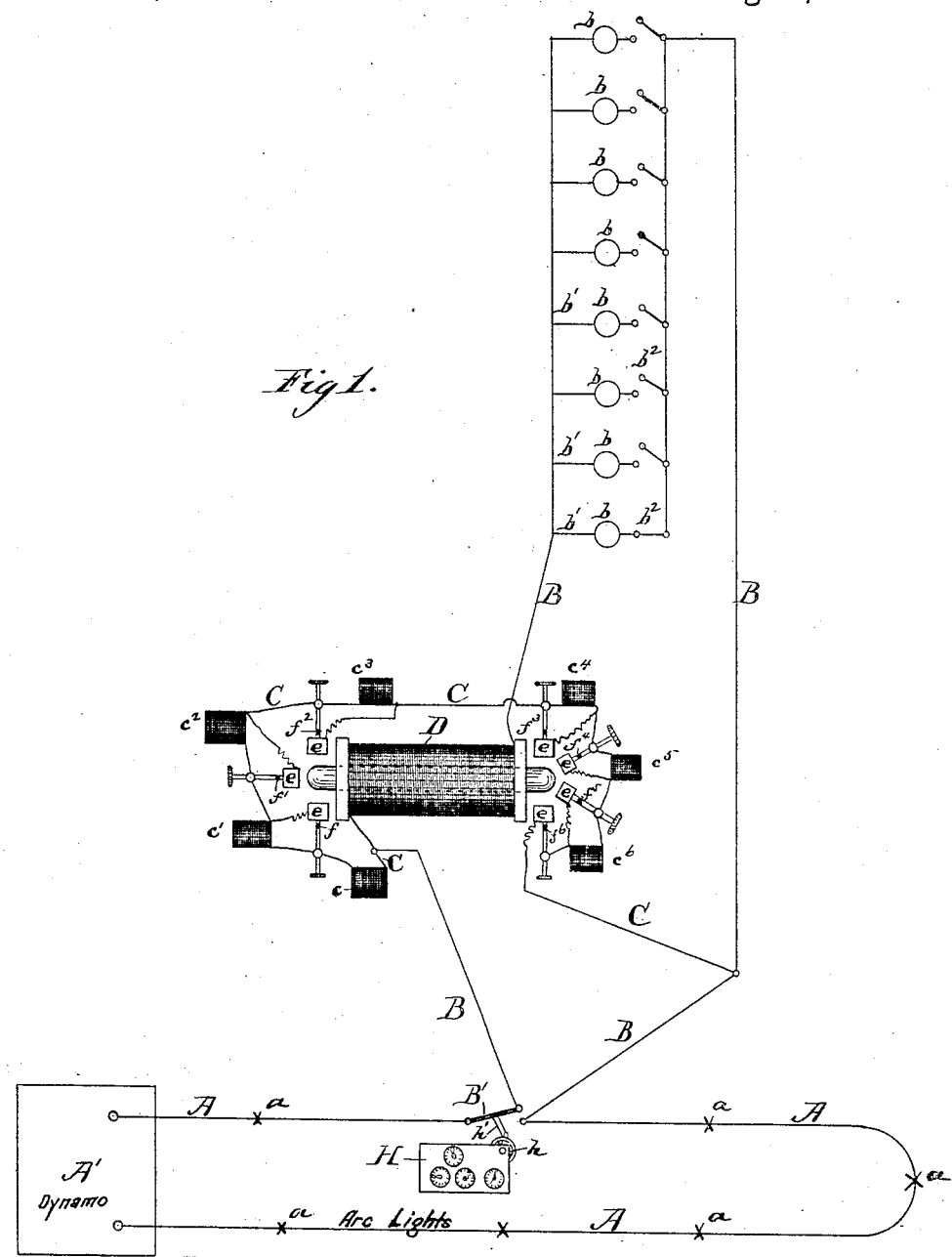

(No Model.) 3 Sheets—Sheet 1.

H. P. BROWN.
SYSTEM OF COMBINED ARC AND INCANDESCENT ELECTRIC LIGHTS.

No. 387,615. Patented Aug. 7, 1888.

Witnesses:
Taylor E. Brown
Lew. E. Curtis

Inventor:
Harold P. Brown,
By Munday, Evarts & Adcock
his Attorneys (No Model.) 3 Sheets—Sheet 2.
H. P. BROWN.
SYSTEM OF COMBINED ARC AND INCANDESCENT ELECTRIC LIGHTS.
No. 387,615. Patented Aug. 7, 1888.
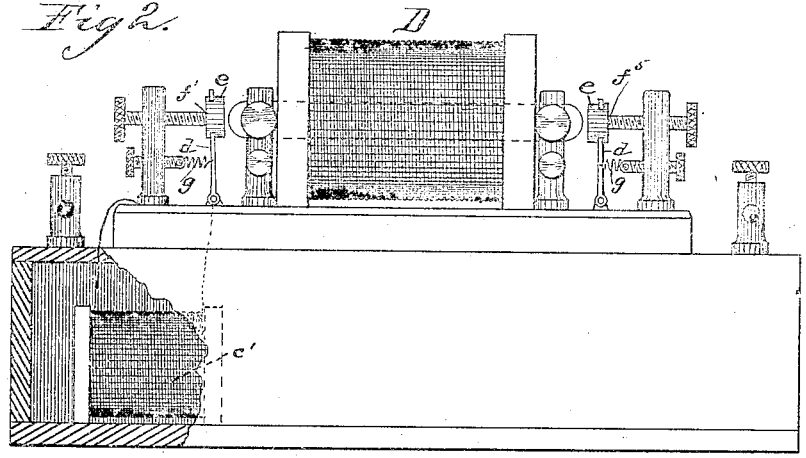
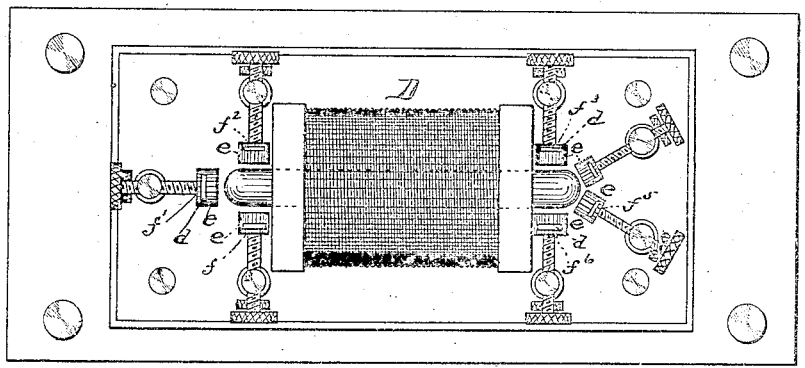
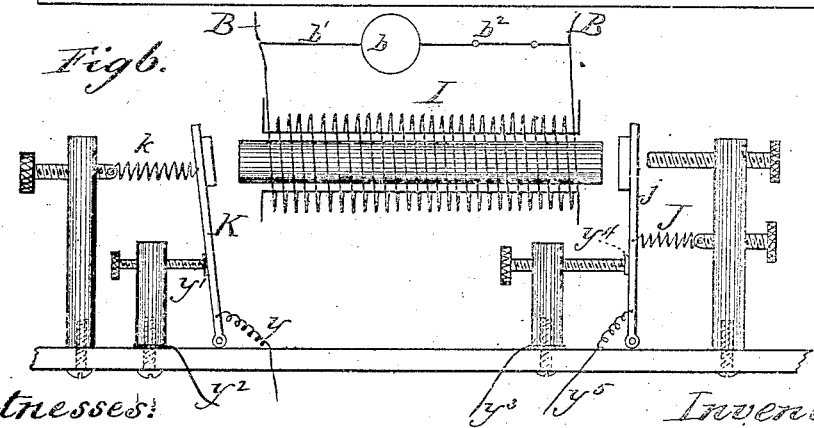
Witnesses:
Taylor E. Brown
Lew. E. Curtis.
Inventor:
Harold P. Brown.
By Munday, Evarts & Adcock
his Attorneys.

(No Model.) 3 Sheets—Sheet 3.

H. P. BROWN.
SYSTEM OF COMBINED ARC AND INCANDESCENT ELECTRIC LIGHTS.

No. 387,615. Patented Aug. 7, 1888.

Witnesses:
Taylor E. Brown
Lew. C. Curtis

Inventor:
Harold P. Brown.
By Munday, Evarts & Adcock,
his Attorneys.

UNITED STATES PATENT OFFICE.

HAROLD P. BROWN, OF CHICAGO, ILLINOIS.

SYSTEM OF COMBINED ARC AND INCANDESCENT ELECTRIC LIGHTS.

SPECIFICATION forming part of Letters Patent No. 387,615, dated August 2, 1888.

Application filed September 29, 1884. Serial No. 144,198. (No model.)

*To all whom it may concern:*

Be it known that I, HAROLD P. BROWN, a citizen of the United States, residing in Chicago, in the county of Cook and State of Illinois, have invented a new and useful Improvement in Systems for Combined Arc and Incandescent Lights, of which the following is a specification.

This invention relates to means of combining in a single circuit, supplied by one source of electric energy, one or more arc lights or other translating devices which require for their operation a high-tension current with one or more incandescent lights or other translating devices which require a quantity-current.

In operating incandescent lights in conjunction with arc lights, the latter are arranged "in series," while the former are arranged "in parallel," as it is commonly termed, and heretofore each incandescent lamp has been furnished with a separate shunt-circuit provided with a resistance equal to that of one lamp, for the purpose of automatically replacing the resistance of that lamp in case of its extinction, because in case of the failure of one or more lamps in the parallel group the remaining lamps of course receive a correspondingly greater portion of the current than they are calculated to withstand, thereby hastening their destruction. The employment thus of a separate shunt-circuit and resistance-coil to each incandescent lamp is objectionable, owing to the great amount of the aggregate resistance-coil required and the consequent expense and loss of electric energy, the multiplication of contact-points, which increases the danger of fire and liability of the apparatus to get out of order, and the general inconvenience of scattering the resistance about the building wherever a lamp is located, or of leading duplicate sets of wires to each lamp.

It is the object of the present invention to overcome these and other difficulties incident to the operation of arc and incandescent lamps from the same circuit; and to this end the invention consists in combining with the main or high-tension circuit in which a number of arc lamps or other translating devices may be arranged in series, and the local or quantity circuit in which a number of incandescent lamps or other like translating devices are arranged "in parallel groups," a shunt-circuit furnished with an automatically-variable resistance to compensate for one or any number of the incandescent lamps in the parallel group which at any time may not be in use. If, for example, the system is adapted to operate or burn eight incandescent lamps in each parallel group, when all the eight lamps are in use the shunt-circuit may be open and no part of the current passing through it. When only one of the eight lamps is in use, the amount of resistance in the shunt-circuit should be such that seven-eighths of the current will pass through it, and when two lamps are in use the resistance in the shunt-circuit must be varied or increased so that only six-eighths of the current will take that course, and so on.

The principle and mode of operation of my invention remains the same whatever be the means or devices employed to automatically vary the resistance in the shunt-circuit to correspond to the number of lamps or other translating devices in use in the parallel group. It will, however, be understood that the most convenient means to automatically vary the resistance in the shunt-circuit is through electro-motive devices operated or put in operation by the current itself. A solenoid, for example, may be located in the local or incandescent-lamp circuit, which will operate to move a switch-lever over different contact-points connected with resistance-coils, so that a greater or less amount of resistance will be thrown into the shunt circuit as the resistance in the lamp-circuit diminishes or increases from time to time by the lighting or extinguishment of some or all of the lamps; or an ordinary electro-magnet may be employed in the local or lamp circuit, and the different resistance-coils may be connected to graduated spring contact-points attached to armatures, so as to be drawn up or released one after another, and thus by making or breaking connection with the resistance-coils increase or diminish the amount of resistance in the shunt-circuit; or the solenoid or other device for making and breaking the connection from time to time with the different resistance-coils may be located in the main circuit and short-circuited, except when the resistance in the lamp or local circuit varies, as will be hereinafter more fully explained; or still other equivalent or substitute means may be employed for this purpose.

Figures 4, 5:
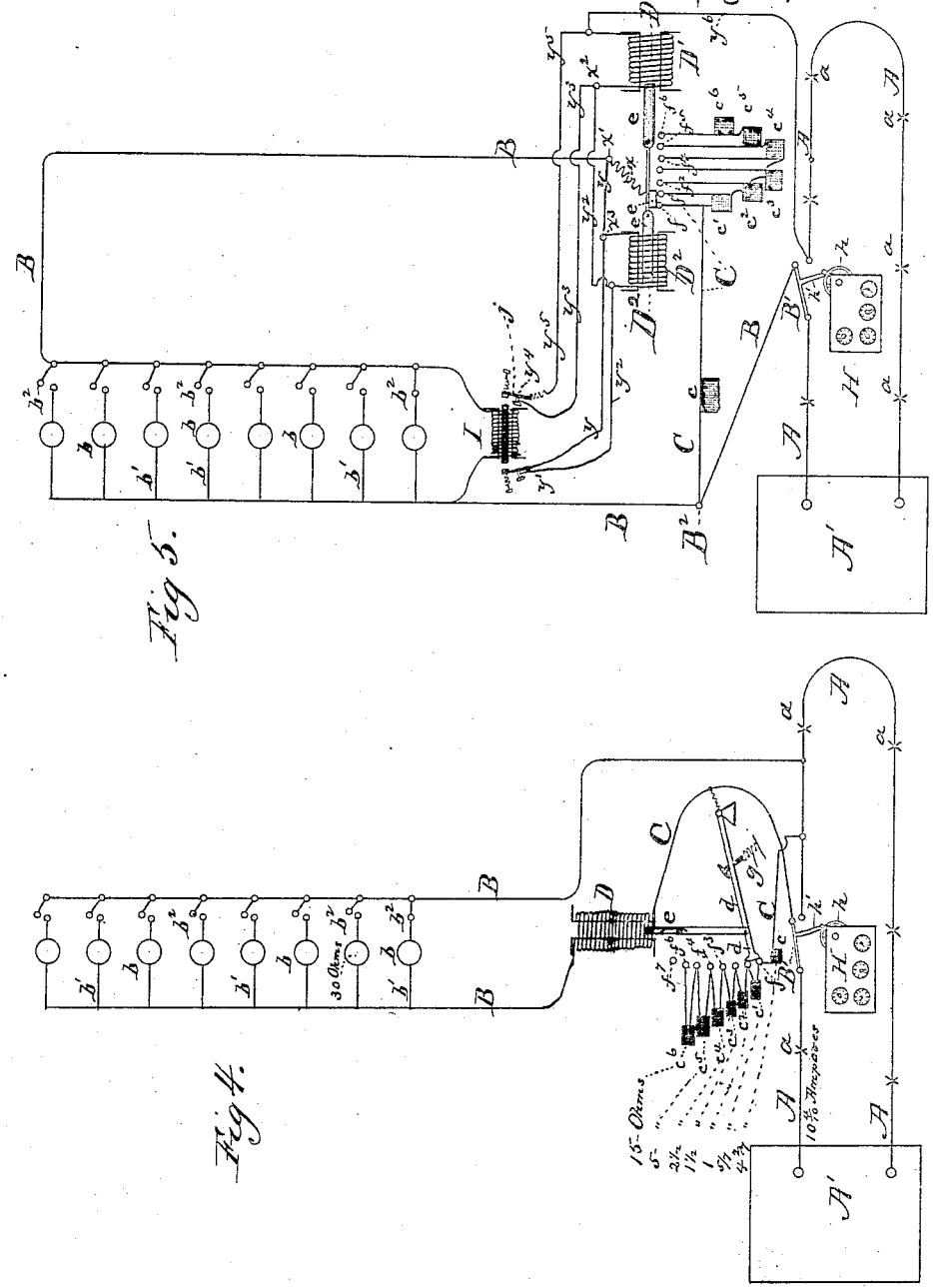

In the accompanying drawings, which form a part of this specification, and wherein like letters of reference indicate like parts, Figure 1 is a diagram view illustrative of my invention, showing the arrangement of circuits. Fig. 2 is a side elevation of a device for varying automatically the amount of resistance in the shunt-circuit. Fig. 3 is a plan view of the same. Figs. 4 and 5 are diagram views showing modified arrangements of the shunt-circuit and means for varying the resistance therein, and Fig. 6 is an enlarged detail side elevation of the magnet in the local or lamp circuit illustrated in Fig. 5.

In the drawings, A represents a main-circuit wire connected to the poles of a dynamo-machine or other source of electric energy, A', in which circuit a number of arc lamps or other translating devices, a, may be arranged in series in the usual manner.

B is a local circuit leading from the switch B' in the main circuit, and in which a number of incandescent lamps, b, or other like translating devices—as, for example, electric motors—are arranged in parallel groups in the usual manner. The lamps b are each located on separate cross-wires b', and switches $b^2$ are provided for lighting and extinguishing each lamp.

C is a shunt-circuit into which the various resistance-coils $c$ $c'$ $c^2$ $c^3$ $c^4$, &c., may be put by any suitable automatic mechanism. The resistance-coils $c$ $c'$ $c^2$ $c^3$ $c^4$, &c., are so proportioned in relation to the high-tension current and the number and resistance of the incandescent lamps or other translating devices in the local circuit that when the resistance-coil $c$ alone is connected with the shunt-circuit the current will be so divided between the shunt-circuit and the local circuit as to properly operate only one of the lamps, and when an additional resistance-coil, $c'$, is put into the shunt-circuit the lamp-circuit will then operate two lamps, and so on until all the resistance-coils are put into the shunt-circuit, when all the lamps will be operated but one. When all the lamps are in operation, the shunt-circuit may of course be open and the whole current passed through the lamp-circuit. In this way it will be understood that the total amount of resistance of all the resistance-coils $c$ $c'$ $c^2$ $c^3$ $c^4$, &c., need only equal the resistance of one lamp whatever be the number of lamps in the parallel group. I thus save a great amount of resistance over that employed in the old way, where a coil equal to the resistance of one lamp is employed for each lamp in the group. The total resistance between the point where the shunt and lamp circuits divide and the place where they reunite will of course be always the same, and will be equal to the total resistance of all the lamps when burning. To make this more clear, suppose, for sake of illustration, that the high-tension current on the main-circuit wire A be one of ten and four-tenths ampères, and suppose that eight incandescent lamps be arranged in the parallel group, each lamp being of thirty ohms resistance when hot and requiring one and three-tenths ampères to give the required candle-power, then the resistance-coil $c$ should be such as to give four and two-sevenths ohms resistance, (plus the resistance of the coil in the lamp-circuit for operating the devices for automatically varying the resistance, if such coil be located in the lamp-circuit,) the coil $c'$ should be of five-sevenths ohm resistance, the coil $c^2$ of one ohm resistance, the coil $c^3$ of one and one-half ohm resistance, the coil $c^4$ of two and one-half ohms resistance, the coil $c^5$ of five ohms resistance, the coil $c^6$ of fifteen ohms resistance, making a total of thirty ohms resistance in the seven coils—that is to say, equal to that of one lamp in the case supposed.

From the above it will be seen that if but one lamp is in operation, and but one resistance-coil, $c$, be in the shunt-circuit, the current dividing inversely as the resistance of the lamp, thirty ohms, and the resistance-coil $c$, four and two-sevenths ohms, one-eighth of the current will pass through the lamp and seven-eighths of it through the shunt-circuit. If only two lamps are in use, the total resistance of which will be fifteen ohms, and two resistance-coils, $c$ and $c'$, be in the shunt-circuit, the total resistance of which will be $4\frac{2}{7} + \frac{5}{7}$, or five ohms, two-eighths of the current will pass through the lamp-circuit; and the same way, when a still greater number of lamps are put in operation in the parallel group, the resistance in the shunt-circuit is increased until, when all the lamps are put in use, the shunt-circuit may be opened or its resistance thus made infinite. The opening of the circuit thus takes the place of one resistance-coil, so that to operate eight lamps in a group but seven resistance-coils need be used in the shunt-circuit.

D represents a magnet, solenoid, or other electro-motive device located in the lamp-circuit.

The resistance coil $c'$ is put in or cut out of the shunt-circuit by the spring-lever $d$, attached to the armature $e$, breaking or making connection at $f$. When connection is broken at $f$ by the magnet D pulling up the armature $e$, the shunt-circuit current will of course pass from the resistance-coil $c$ through coil $c'$, and in the same way the coils $c^2$ $c^3$ $c^4$ $c^5$ $c^6$ are put in or out by the levers $d$ having armature $e$, breaking or making connection at $f'$ $f^2$ $f^3$ $f^4$ $f^5$. The final armature-lever $d$, which breaks connection at $f^6$, opens the shunt-circuit and thus cuts out the resistance-coil $c$, which at all other times remains in. The springs $g$ of the different armature-levers are so graduated that the armature-levers are drawn up successively by the magnet as the lamp-circuit current through the coil of the magnet D increases.

H represents a clock with escapement $h$, that is started by an arm, $h'$, on the switch B' when said switch is opened and the current passing through the local circuit. This clock will thus serve to measure the time the incandescent lamps are in operation. When the switch B' is closed, the arm h' on the switch stops the clock. As shown in the drawings, this clock is furnished with four dials, to indicate hours, tens of hours, hundreds of hours, and thousands.

In the modified arrangement shown in Fig. 4 the device D, for making and breaking the connections to put the various resistance-coils in or out of the shunt-circuit, consists of a solenoid, the movable core or armature $e$ of which operates a single lever $d$ and moves the same over a number of contact-points, $f$ $f'$ $f^2$ $f^3$ $f^4$ $f^5$ $f^6$ $f^7$. In this arrangement the end of the lever $d$ should be large enough to touch two of the contact-points at once, so that the shunt-circuit may not be broken as the lever is raised. When an additional lamp in the group is put in operation, the resistance through the lamp-circuit being thereby diminished, the force of the current through the lamp-circuit and the coil of the solenoid D therein is thereby increased, which raises the armature $e$, thus moving the lever $d$ over another contact-point and putting an additional resistance-coil in the shunt-circuit. When a lamp is, or happens to be, extinguished the effect is in like manner automatically to diminish the force of the solenoid and drop the lever $d$, and thus cut out one of the resistance-coils from the shunt-circuit.

In Fig. 4 I have marked on the drawing the relative size of the various resistance-coils in the case before supposed.

In the modification shown in Fig. 5 a double solenoid is employed for making and breaking the connections to the different resistance coils, and though located in the main circuit it is normally short-circuited, so that the current or any appreciable portion of it does not pass through the coils of the solenoid except momentarily while in operation to make and break the connections to the different resistance coils. In this arrangement the current is directed through the solenoid-coil when it is necessary to change the resistance in the shunt-circuit by means of an electro-magnet, I, in the local circuit, arranged in parallel, like one of the lamps, so that only a small fraction of the current will pass through the coil of the magnet. By this arrangement a considerable saving of electric energy is made. In the arrangement shown in Fig. 5 the shunt-circuit wire C divides from the local-circuit wire at B², thence passes through the resistance-coil $c$, thence through the contact-point $f$ to the armature $e$, and thence through the wire $x$, and reunites at $x'$ with the lamp or local-circuit wire B. The reunited current then passes along the short-circuit wire $y$ through the contact-point $y'$, short-circuit wire $y^2$, short-circuit wire $y^3$, contact-point $y^4$, short-circuit wire $y^5$, back through wire $y^6$, to the main line A. When an additional lamp is lighted, it of course diminishes the current that passes through the coil of the magnet I, and the force of the magnet is weakened, thus permitting the spring J to withdraw the armature-lever $j$, and thus break the connection at $y'$ between the short-circuit wires $y^2$ and $y^3$, thus causing the current to pass from the point $x^2$ through the coil D' of the solenoid, and thereby draw its movable core or armature $e$ to the right over the contact-point $f'$, for example, and thus put the resistance-coil $c'$ into the shunt-circuit. The moment an additional resistance-coil is put into the shunt-circuit it of course increases the current in the lamp-circuit and through the coil of the magnet I, thus drawing up the armature lever $j$ and, again making connections at $y'$, re-establishes the current through the short-circuit wires $y^2$ $y^3$, so that none of the current or only a small fraction of it will pass through the coil D' of the solenoid. When, on the other hand, one of the lamps is extinguished, it of course momentarily increases the current through the coil of the magnet I, thus drawing up the armature-lever K and breaking the connection at $y'$ between the short-circuit wires $y$ and $y^2$, thus causing the current to pass from the point $x^3$ through the other coil, D², of the solenoid, thereby drawing the armature $e$ to the left over one of the contact-points $f$ $f'$ $f^2$, &c., thus cutting out one of the resistance-coils from the shunt-circuit. The moment one of the resistance-coils is cut out the current through the local circuit and the coil of the magnet I is diminished, thus causing the spring $k$ to pull back the lever K and re-establish the short circuit through the contact-point $y'$.

The modification illustrated in Fig. 5—whereby the solenoid or other electro-motive devices for making and breaking the connections to the various resistance-coils in the shunt-circuit is short-circuited and put in operation by an electro-motive device or magnet arranged in the local-circuit in parallel with the lamps—involves an improvement over the form of the invention shown in Fig. 1, which, not being claimed herein, I hereby specially reserve as the subject-matter of a separate application to be filed by me prior to the issuance of a patent upon this application.

It will of course be understood that a number of parallel groups of incandescent lamps or like translating devices may be employed in series in the main circuit, each group of incandescent lamps being considered as the equivalent of one arc light.

It will of course be understood that the variable resistance may consist of metallic coils or other suitable resistances.

I claim—

1. The combination of a main or high-tension circuit with a local or incandescent-lamp circuit in which two or more incandescent lamps or other translating devices are arranged in parallel group, and a shunt-circuit furnished with an automatically-variable resistance to compensate for such lamps in the parallel group as may not be in use, substantially as specified.

2. The combination of a main or high-tension current circuit with a local or incandescent-lamp circuit, two or more incandescent lamps or other translating devices arranged in parallel group in said local circuit, an electro-motive device in said local circuit, a circuit-controlling lever or device operated thereby, a shunt-circuit, and a series of graduated resistances having connections with said shunt-circuit operated by said circuit-controlling lever or device, substantially as specified.

3. The combination of main or high-tension current circuit A, local or incandescent-lamp circuit B, furnished with two or more incandescent lamps or other like translating devices arranged in parallel group, and shunt-circuit C, furnished with a series of graduated resistance-coils, and means for automatically making connection therewith to increase or diminish the resistance in the shunt-circuit as the resistance in the lamp-circuit diminishes or increases, substantially as specified.

4. The combination of main or high-tension current circuit A with local or incandescent-lamp circuit B, having two or more incandescent lamps in parallel group, each lamp being provided with a switch, and shunt-circuit C, furnished with an automatically-variable resistance to regulate the current through the lamps as the same are lighted or extinguished, substantially as specified.

5. The combination of main circuit A with local or incandescent-lamp circuit B, having two or more incandescent lamps in parallel group, and a shunt-circuit provided with a series of resistance-coils graduated to the number of lamps in the parallel group, and means operated or put in operation by the lamp-circuit current to put said resistance-coils successively in or out of the shunt-circuit according as a lamp in the parallel group is lighted or extinguished, substantially as specified.

6. The combination, with a group of incandescent lamps or other like translating devices in parallel, of a shunt-circuit provided with a variable resistance, an electro-motive device, and a circuit-controlling lever or device operated thereby for varying said resistance, substantially as specified.

7. The combination of the circuit having incandescent lamps or equivalent translating devices in parallel group, a magnet in said circuit provided with several armatures adjusted to require different degrees of force to move them, and several resistance-coils in a shunt-circuit having connections operated by said armatures, substantially as specified.

8. The combination of an incandescent-lamp circuit having two or more incandescent lamps in parallel group with a shunt-circuit furnished with a series of resistance-coils, and an electro-motive device actuated by the lamp-circuit current to make and break connection with said resistance coils, substantially as specified.

9. A system for operating on one circuit arc lamps and multiple-arc groups of incandescent lamps, said system consisting in a suitable dynamo or electric-current generator, an external or working circuit energized by said generator, arc lamps located in series upon said circuit, and one or more multiple-arc groups of incandescent lamps connected in said circuit with a shunt connecting with said main or working circuit on each side of and around each group of incandescent lamps, and each shunt containing an automatically-variable resistance for determining and governing the current operating said incandescent lamps, substantially as specified.

10. The means of operating on one circuit arc lamps and multiple-arc groups of incandescent lamps, consisting in a shunt about each group of incandescent lamps having an automatically-variable resistance and an electro-motive device to vary the resistance, substantially as specified.

11. The combination, in an arc-light circuit, of a group of incandescent lamps or other translating devices in multiple arc, with a rheostat and an electro-motive device for varying the resistance of the rheostat, substantially as specified.

HAROLD P. BROWN.

Witnesses:
EDMUND ADCOCK,
H. M. MUNDAY.